(12) United States Patent
Cappeller et al.

(10) Patent No.: US 9,534,734 B2
(45) Date of Patent: Jan. 3, 2017

(54) APPARATUS FOR THE CONTROLLED PRESSURIZATION OF GAS CYLINDER ACTUATORS

(71) Applicant: SPECIAL SPRINGS S.R.L., Romano D'ezzelino (IT)

(72) Inventors: Augusto Cappeller, Bassano Del Grappa (IT); Alessandro Cappeller, Tezze Sul Brenta (IT); Dante Cappeller, Cartigliano (IT)

(73) Assignee: SPECIAL SPRINGS S.R.L., Romano d'Ezzelino (IT)

( * ) Notice: Subject to any disclaimer, the term of this patent is extended or adjusted under 35 U.S.C. 154(b) by 0 days.

(21) Appl. No.: 14/615,947

(22) Filed: Feb. 6, 2015

(65) Prior Publication Data

US 2015/0233527 A1  Aug. 20, 2015

(30) Foreign Application Priority Data

Feb. 17, 2014  (IT) .............................. PD2014A0029

(51) Int. Cl.
*F16K 31/02* (2006.01)
*F17C 5/00* (2006.01)
(Continued)

(52) U.S. Cl.
CPC ............. *F17C 5/007* (2013.01); *F16F 15/027* (2013.01); *F17C 5/06* (2013.01); *F17C 13/025* (2013.01);
(Continued)

(58) Field of Classification Search
CPC ........... F17C 5/007; F17C 5/06; F17C 13/025; F17C 13/026; F17C 2250/03; F17C 2250/043; F16F 15/027; F16F 2230/18; Y10T 137/7761; Y10T 137/7762; Y10T 137/7764; Y10T 137/87225; Y10T 137/86397; Y10T 137/877; Y10T 137/87708; Y10T 137/87877; Y10T 137/0396
(Continued)

(56) References Cited

U.S. PATENT DOCUMENTS 3,119,308 A * 1/1964 Dantowitz .............. F15B 11/10
137/596.18
6,076,557 A * 6/2000 Carney ................... F15B 1/103
138/30

(Continued)

FOREIGN PATENT DOCUMENTS

WO  WO 99/22272 A1  5/1999

*Primary Examiner* — Craig Schneider
*Assistant Examiner* — Minh Le
(74) *Attorney, Agent, or Firm* — Scully, Scott, Murphy & Presser, P.C.

(57) ABSTRACT

An apparatus for the controlled pressurization of gas cylinder actuators connected to a single gas filling line, comprising
- elements for controlling and recovering a pressurized gas flow originating from pressurized gas supply elements and directed to a gas filling line,
- at least one sensor for detecting the pressure of the gas that is present in the gas filling line which is adapted to carry pressurized gas to at least one gas cylinder actuator connected thereto,
- electrically controlled valve elements adapted to allow/interrupt the flow of pressurized gas in the gas filling line,
- an electronic control and management unit connected to the at least one pressure sensor and to the electrically controlled valve elements to automate the opening/closing of the valve elements in dependence on the signals that arrive from the at least one pressure sensor.

15 Claims, 2 Drawing Sheets

(51) Int. Cl.
*F17C 5/06* (2006.01)
*F17C 13/02* (2006.01)
*F16F 15/027* (2006.01)

(52) U.S. Cl.
CPC .......... *F17C 13/026* (2013.01); *F16F 2230/18* (2013.01); *F17C 2250/03* (2013.01); *F17C 2250/043* (2013.01); *Y10T 137/7761* (2015.04)

(58) Field of Classification Search
USPC .... 137/487.5, 489, 488, 565.18, 624.12, 14, 137/861, 862, 883
See application file for complete search history.

(56) References Cited

U.S. PATENT DOCUMENTS

| | | | | |
|---|---|---|---|---|
| 6,332,623 B1* | 12/2001 | Behmenburg | ..... | B60G 17/0155 267/64.11 |
| 6,845,988 B2* | 1/2005 | Romer | ................ | B60G 17/052 280/124.16 |
| 6,913,031 B2* | 7/2005 | Nawata | ................ | G05D 7/0635 137/12 |
| 7,255,358 B2* | 8/2007 | Kim | .................... | B60G 17/0155 280/124.157 |
| 7,552,932 B2* | 6/2009 | Matern | .............. | B60G 17/0155 280/124.16 |
| 8,494,789 B2* | 7/2013 | Boissonneau | ......... | F15B 19/005 303/122.09 |
| 2007/0186982 A1* | 8/2007 | Cohen | ..................... | F17C 5/007 137/487.5 |
| 2011/0005250 A1* | 1/2011 | Perz | .................... | G05D 16/2013 62/222 |
| 2013/0026687 A1 | 1/2013 | Milinkovic | | |
| 2013/0186475 A1* | 7/2013 | Heitz | .................. | G01N 33/0006 137/14 |
| 2013/0320639 A1* | 12/2013 | Frank | ................. | B60G 17/0523 280/5.514 |
| 2013/0320645 A1* | 12/2013 | Gall | ....................... | B60G 11/27 280/124.16 |
| 2014/0096837 A1* | 4/2014 | Belady | ................ | F16L 55/0333 137/14 |

* cited by examiner

APPARATUS FOR THE CONTROLLED PRESSURIZATION OF GAS CYLINDER ACTUATORS

The present invention relates to an apparatus for the controlled pressurization of gas cylinder actuators connected to a single gas filling line.

Currently the use of groups of gas cylinder actuators in order to retain in position metal sheets during operations for stamping said metal sheets, for example stamping operations for drawing or blanking metal sheets, is known and widespread.

The gas cylinder actuators of a same group are connected to a single pressurized gas line, by means of which said gas cylinder actuators are filled with pressurized gas.

Generally, during operation the gas cylinder actuators of one group of gas cylinder actuators undergo internal pressure drops due for example to wear of the sealing gaskets.

These internal pressure drops of the gas cylinder actuators cause a less than optimum development of the stamping operations, with consequent quality problems for the metal sheets being worked, since the metal sheets would be retained by forces that are diversified and therefore not uniform with different actuators.

Since these pressure drops inside the gas cylinder actuators are not acceptable, normally when these problems arise it is necessary to temporarily stop stamping operations, with consequent halting of production, and to manually restore the pressure in the various gas cylinder actuators unless, in the worst case, a prolonged stop of the stamping operations is required for extraordinary maintenance.

Production halting usually causes considerable economic losses to the manufacturer.

The aim of the present invention is to provide an apparatus for the controlled pressurization of gas cylinder actuators connected to a single gas filling line that is capable of obviating the cited limitations of groups of gas cylinder actuators of the known type.

Within the scope of this aim, an object of the invention is to provide an apparatus that makes it possible to restore the correct pressure inside the gas cylinder actuators in a short time without having to halt production.

Another object of the invention is to provide a programmable apparatus that operates automatically without the need of manual intervention of an operator.

This aim, as well as these and other objects that will become more apparent hereinafter, are achieved by an apparatus for the controlled pressurization of gas cylinder actuators connected to a single gas filling line, characterized in that it comprises means for controlling and recovering a pressurized gas flow originating from pressurized gas supply means and directed to a gas filling line, at least one sensor for detecting the pressure of the gas that is present in said gas filling line and is adapted to carry pressurized gas to at least one gas cylinder actuator connected thereto, electrically controlled valve means adapted to allow/interrupt the flow of pressurized gas in said gas filling line, an electronic control and management unit connected to said at least one pressure sensor and to said electrically controlled valve means to automate the opening/closing of said valve means in relation to the signals that arrive from said at least one pressure sensor.

Further characteristics and advantages of the invention will become more apparent from the description of a preferred but not exclusive embodiment of the apparatus according to the invention, illustrated by way of non-limiting example in the accompanying drawings, wherein.

Figure 1:
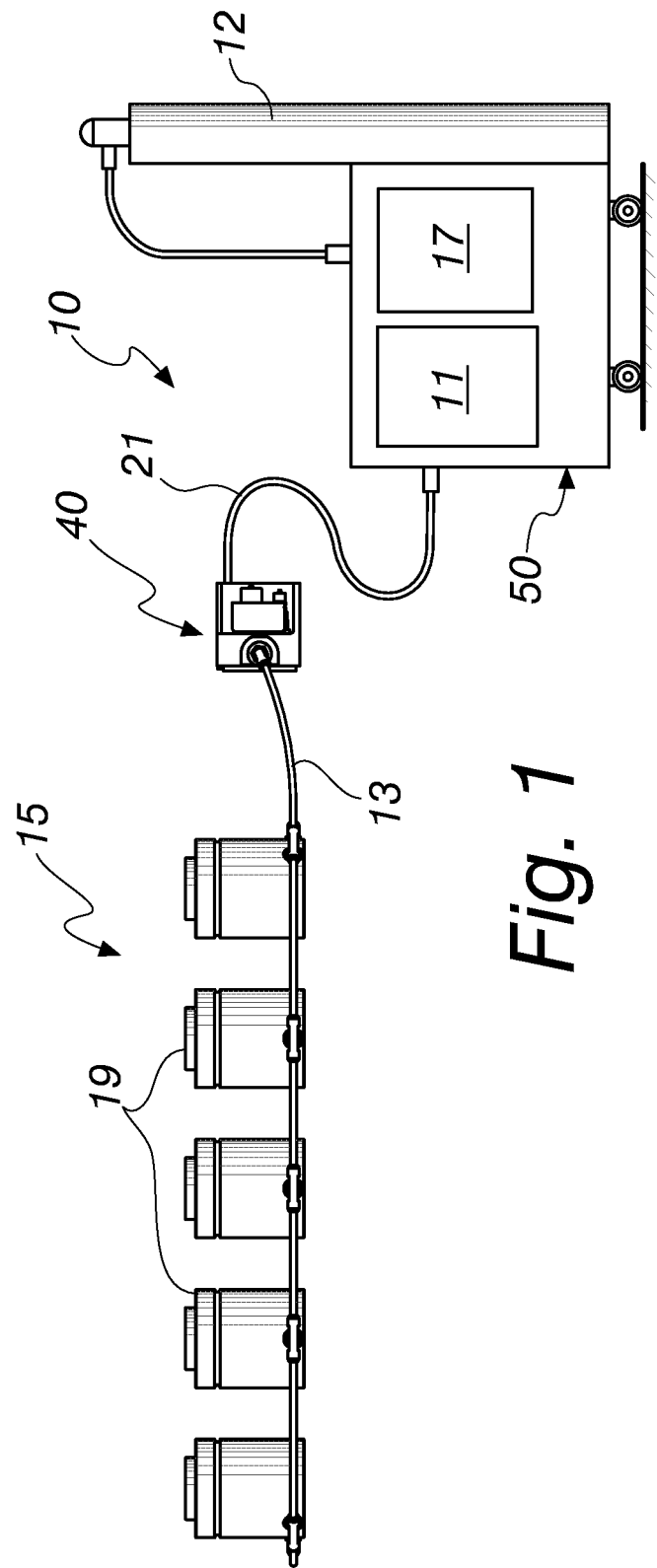
FIG. 1 is an exemplifying diagram of an apparatus according to the invention.

With reference to the cited figures, an apparatus for the controlled pressurization of gas cylinder actuators connected to a single gas filling line, according to the invention, is designated generally by the reference numeral 10.

Such apparatus 10 comprises means 11 for controlling and recovering a pressurized gas flow originating from pressurized gas supply means 12 and directed to a gas filling line 13, a sensor 14 for detecting the pressure of the gas that is present in said gas filling line 13 and is adapted to carry pressurized gas to at least one gas cylinder actuator and, for example, to a group of gas cylinder actuators 15 connected thereto, such as a group of gas cylinder actuators to be applied to a sheet metal stamping press, electrically controlled valve means 16 adapted to allow/interrupt the flow of pressurized gas in said gas filling line 13, an electronic control and management unit 17 connected to said pressure sensor 14 and to the electrically controlled valve means 16 to automate the opening/closing of said valve means 16 in relation to the signals that arrive from said at least one pressure sensor 14.

The pressurized gas supply means 12 are constituted for example by a bottle filled with gas, for example nitrogen, of a known and commercially available type.

The gas filling line 13 comprises one or more flexible hoses for pressurized gas.

The pressure sensor 14 is constituted for example by a pressure-controlled switch, which is preset to detect the minimum and maximum operating pressures of the gas in the line 13 and is arranged upstream of the branches that connect the individual gas cylinder actuators 19.

The group of gas cylinder actuators 15 connected to the line 13 comprises a plurality of gas cylinder actuators 19 that are connected substantially in parallel.

Figure 2:
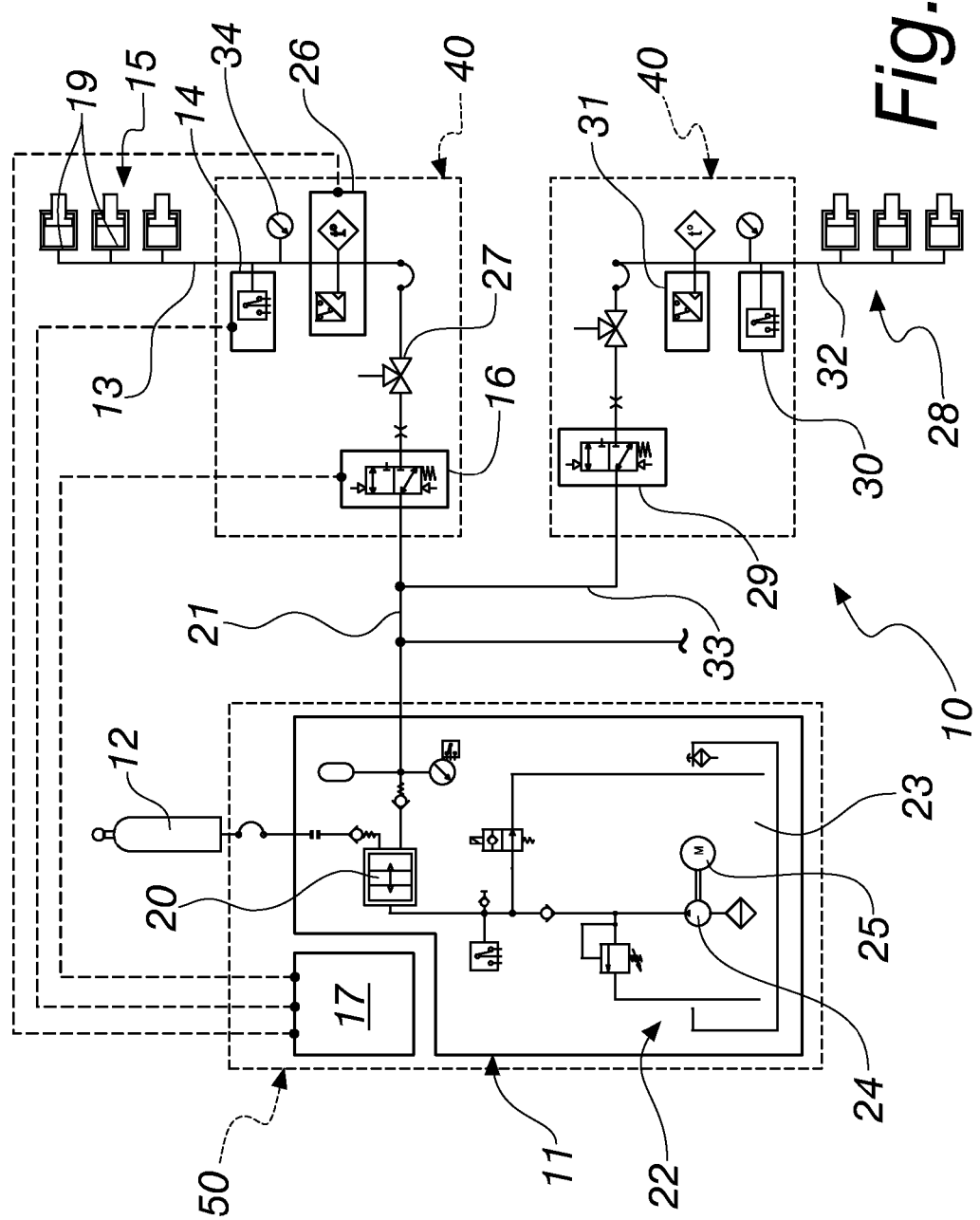
FIG. 2 is a detailed diagram of the apparatus according to the invention.

The electrically controlled valve means 16 are constituted, in the present constructive example, by a three-way electric valve, clearly shown schematically in FIG. 2, and are arranged upstream of the pressure sensor 14.

The electronic control and management unit 17 is connected to said pressure sensor 14 and to the electrically controlled valve means 16 in order to automate the opening/closing of the valve means 16 in relation to the signals that arrived from the pressure sensor 14.

The means 11 for controlling and recovering the flow of pressurized gas that arrives from the pressurized gas supply means 12 or from the connected bottle comprise a membrane accumulator 20, for example of the oil type, which is arranged in output of the gas supply means 12 and ahead of a line 21 for connection to the valve means 16; a corresponding oil charge and discharge circuit 22 is connected to said membrane accumulator 20 and in turn comprises an oil recovery tank 23 and associated oil pumping means 24, for example a pump with an electric motor 25, which are adapted to bring the membrane accumulator 20 to a desired pressure, so as to obtain in output from the accumulator 20 a pressure of the gas flow, for example higher than or equal to 150 bar, that is useful for the correct operation of the connected group of gas cylinder actuators 15.

The means 11 in fact cause the recovery, from the gas-filled bottle, of the gas that is present inside the partially depleted bottle at a pressure that is lower than the useful pressure for loading the gas cylinder actuators, a pressure for example of 150 bar; the gas that exits from the bottle at a pressure below 150 bar gathers within the membrane accumulator 20, from which, thanks to the pressure of the oil on the membrane that contains the gas, it is propelled into the filling line 13 at the pressure determined by the oil, which in turn is pressurized by the oil pumping means 24.

The gas control and recovery means 11 are to be understood as being of a type known per se and replaceable with other similar equivalent pressurized gas control and recovery means.

In addition to the pressure sensor 14, in a constructive variation the apparatus 10 comprises a temperature sensor 26, which is connected to the electronic control and management unit 17.

The temperature sensor 26 is preset to control the temperature of the pressurized gas within the filling line 13.

The temperature sensor 26 is constituted for example by a thermostat, which is suitable to be activated when a preset temperature threshold that the gas must not exceed is exceeded.

A valve 27 for manual discharge of the filling line 13 is also connected to the valve means 16.

The apparatus 10 can be connected to more than one group of gas cylinder actuators 15; for example, FIG. 2 shows by way of example a second group of gas cylinder actuators 28 with which corresponding valve means 29, a pressure sensor 30 and a temperature sensor 31 are associated and arranged on the filling line 32 of the group of gas cylinder actuators 28 and are in turn connected, by means of a second respective connecting line 33, to the same pressurized gas flow control and recovery means 11.

Once one or more groups of gas cylinder actuators 15 have been set up on a press for stamping metal sheets, and once the gas filling lines 13 have been connected to the apparatus 10 according to the invention, the operation of the apparatus 10 according to the invention is as follows.

The pressure values are set at which the pressure sensor 14, and 31 if another group of gas cylinder actuators 28 is present as well, or the pressure-controlled switch, must be triggered, indicating that one of the two set pressure values in the gas filling line 13 or 32 has been reached.

The trigger temperature of the temperature sensor 26, or the thermostat, if present on a filling line, is set.

The electronic control and management unit 17, which can be for example a programmable logic controller (PLC) or another computer of a type known per se, is set so that:
   if the pressure sensor 14 or 31 detects a drop in the pressure in the filling line 13 or 32 the electronic control and management unit 17 sends an alarm signal to the stamping press at which the group 15, or the groups 15 and 28, of gas cylinder actuators are set up, and actuates the opening of the electrically controlled valve means 16 or 29 to introduce pressurized gas into the gas filling line 13 or 32 until the pressure sensor 14 or 30 signals the return of the pressure to within the preset limits;
   when the pressure sensor 14 or 30 indicates the return of the pressure to within the preset limits, the electronic control and management unit 17 actuates the closure of the valve means 16 or 29 and the restart of the stamping press;
   if the temperature sensor 26 detects a temperature value that is higher than the preset value, for example between 70° C. and 80° C., the electronic control and management unit 17 actuates this halting of the stamping press in order to avoid stamping parts that might be nonconforming.

During activity, as well as at the end of activity, it is possible to visualize the pressure inside the groups of gas cylinder actuators 15 and 28 thanks to an analog pressure gauge, for example 34, arranged on the gas filling line, for example the filling line 13.

At the end of activity it is possible:
   to discharge the pressurized gas that is present in the filling line 13, by operating the manual valve 27,
   to discharge the pressure that is present in the filling line 13 automatically, actuating the three-way valve that defines the electrically controlled valve means 16.

These activities described for the first group of gas cylinder actuators 15 are to be understood as being obviously applicable also to other groups of gas cylinder actuators, for example 28, to which the same apparatus 10 is applied.

A similar apparatus 10 according to the invention can be provided by including in a single device 40 the electrically controlled valve means 16, the pressure sensor 14 and the optional temperature sensor 26, and by connecting it to the means 11 for the control and recovery of a pressurized gas stream, which in turn arrives from the pressurized gas supply means, i.e., from the bottle, with flexible hoses provided with quick coupling connectors.

As an alternative, the electrically controlled valve means 16, the pressure sensor 14 and the optional temperature sensor 26 might be integrated in the gas control and recovery means 11 without the interposition of flexible hoses.

At the same time, the gas control and recovery means 11 and the electronic control unit can be mounted on a single support and transport frame 50, for example a trolley, thus making it very easy to position them and move them within the workspace.

In this manner, the apparatus 10 can be removed easily from the group or groups of gas cylinder actuators with which it has been associated and can be transported easily.

The apparatus 10 according to the invention is described here as applied to one or more groups of gas cylinder actuators, but it should be understood that it is obviously applicable also to a single gas cylinder actuator.

In practice it has been found that the invention achieves the intended aim and objects.

In particular, the invention provides an apparatus that allows restoring the correct pressure within a group of gas cylinder actuators connected to a single gas filling line in a short time and without having to halt production.

Moreover, the invention provides a programmable apparatus that operates automatically without the need of manual intervention of an operator.

The invention thus conceived is susceptible of numerous modifications and variations, all of which are within the scope of the appended claims; all the details may further be replaced with other technically equivalent elements.

In practice, the components used, so long as they are compatible with the specific use, as well as the contingent shapes and dimensions, may be any according to the requirements and the state of the art.

The disclosures in Italian Patent Application No. PD2014A000029 from which this application claims priority are incorporated herein by reference.

What is claimed is:

1. An apparatus for the controlled pressurization of gas cylinder actuators connected to a single gas filling line, comprising means for controlling and recovering a pressurized gas flow originating from pressurized gas supply means and directed to a gas filling line, at least one sensor for detecting the pressure of the gas that is present in said gas filling line and is adapted to carry pressurized gas to at least one gas cylinder actuator connected thereto, electrically controlled valve means adapted to allow/interrupt the flow of pressurized gas in said gas filling line, an electronic control and management unit connected to said at least one pressure sensor and to said electrically controlled valve means to automate the opening/closing of said valve means in dependence on the signals that arrive from said at least one pressure sensor.

2. The apparatus according to claim 1, wherein said pressure sensor is constituted by a pressure-controlled switch.

3. The apparatus according to claim 1, wherein said electrically controlled valve means are constituted by a three-way electric valve.

4. The apparatus according to claim 1, wherein said means for controlling and recovering the flow of pressurized gas that arrives from the pressurized gas supply means comprises a membrane accumulator arranged in output of the gas supply means and ahead of a line for connection to the valve means.

5. The apparatus according to claim 1, further comprising a single device that incorporates the electrically controlled valve means, the pressure sensor and an optional temperature sensor, said single device being connected to the means for controlling and recovering a pressurized gas flow by means of flexible hoses provided with quick coupling connectors.

6. The apparatus according to claim 5, wherein said temperature sensor is connected to the electronic control and management unit and is preset to monitor the temperature of the pressurized gas in the filling line.

7. The apparatus according to claim 1, wherein a valve for manual discharge of the filling line is connected to the valve means.

8. The apparatus according to claim 1, wherein it can be connected to one or more groups of gas cylinder actuators.

9. An apparatus for the controlled pressurization of gas cylinder actuators connected to a single gas filling line, comprising an element for controlling and recovering a pressurized gas flow originating from a pressurized gas supply and directed to a gas filling line, at least one sensor for detecting the pressure of the gas that is present in said gas filling line and is adapted to carry pressurized gas to at least one gas cylinder actuator connected thereto, an electrically controlled valve adapted to allow/interrupt the flow of pressurized gas in said gas filling line, an electronic control and management unit connected to said at least one pressure sensor and to said electrically controlled valve to automate the opening/closing of said valve in dependence on the signals that arrive from said at least one pressure sensor, the apparatus further comprising a single device that incorporates the electrically controlled valve, the pressure sensor and a temperature sensor, said single device being connected to the element for controlling and recovering a pressurized gas flow by flexible hoses provided with quick coupling connectors.

10. The apparatus according to claim 9, wherein said pressure sensor is constituted by a pressure-controlled switch.

11. The apparatus according to claim 9, wherein said electrically controlled valve is constituted by a three-way electric valve.

12. The apparatus according to claim 9, wherein said element for controlling and recovering the flow of pressurized gas that arrives from the pressurized gas supply comprises a membrane accumulator arranged in output of the gas supply and ahead of a line for connection to the valve.

13. The apparatus according to claim 9, wherein said temperature sensor is connected to the electronic control and management unit and is preset to monitor the temperature of the pressurized gas in the filling line.

14. The apparatus according to claim 9, wherein a valve for manual discharge of the filling line is connected to the valve.

15. The apparatus according to claim 9, wherein it can be connected to one or more groups of gas cylinder actuators.

* * * * *